Figure 1:
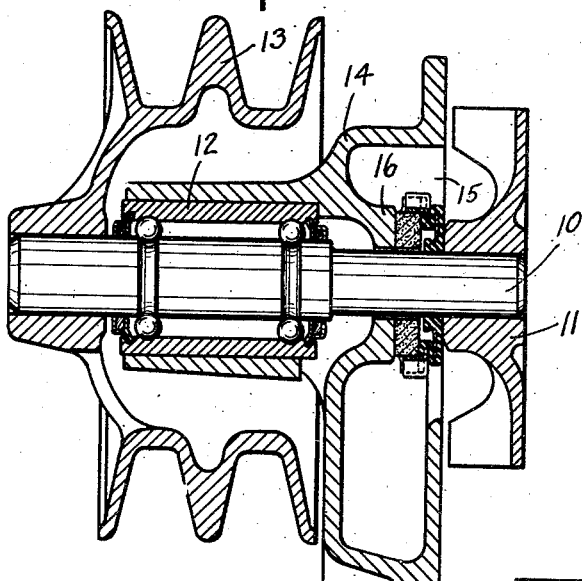

Dec. 12, 1944.    T. E. FRANKENFIELD    2,365,065
FLUID SEALING DEVICE
Filed Nov. 23, 1942

INVENTOR.
TITUS E. FRANKENFIELD.
BY Lockwood, Goldsmith & Galt,
ATTORNEYS.

Patented Dec. 12, 1944

2,365,065

UNITED STATES PATENT OFFICE 2,365,065

FLUID SEALING DEVICE

Titus E. Frankenfield, Indianapolis, Ind., assignor to Schwitzer-Cummins Company, Indianapolis, Ind., a corporation Application November 23, 1942, Serial No. 466,627

6 Claims. (Cl. 286—11)

This invention relates to a fluid sealing device which is particularly useful in effecting a seal between a shaft or stud and a housing or member between which there is relative rotation, such as in a water pump or the like, which comprises that type of seal commonly known as a flexible self-sealing self-contained unit.

One object of the invention is to provide a seal of this character which is more compact in its assembled relation with the carbon washer than those heretofore devised, by reason of its reduced thickness taken axially thereof, which permits of a shortened overall length of shaft with the resultant saving of space occupied by the fan and water pump assemblies of internal combustion engines. It further has the advantage of eliminating the necessity of forming a bore in the impeller. Thus, the diameter of the impeller hub may be substantially reduced, as well as the elimination of the usual lugs thereon, for interlocking engagement with the carbon seal or sealing washer.

Still a further advantage, as a result of the above, is that by reason thereof the intake opening, such as present in the water pump, is freer from obstructions, thereby rendering the pump or the like more efficient and effective.

One feature of the invention resides in the character and form of the spring element, such as to permit its incorporation within the flexible rubber seal member to permit its flexing to a substantially flattened position when under sealing compression.

Another feature of the invention resides in the form and relation of the spring relative to the flexible sealing member as to effect a wedging action about the inner periphery of said member to resiliently force and maintain it in sealing engagement with the shaft, and providing the driving contact for the whole seal unit.

Another feature of the invention resides in the relation of the flexible sealing member with a peripheral retaining ring for supporting and holding the carbon sealing washer in fixed relation to the shaft, whereby the usual driving lugs may be eliminated. Thus the sealing washer is driven by the unit instead of the impeller, which results in more of a self-contained unitary structure than heretofore.

A further feature involves the restraining action of the peripheral retaining ring, such as to restrain outer flexing of the seal and thereby direct the flexing forces inwardly to exert a sealing pressure about the shaft or the like when the seal is compressed.

Figure 2:
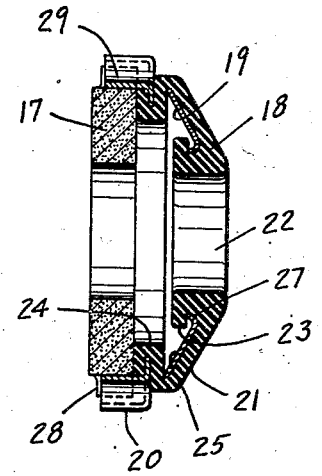
Figure 3:
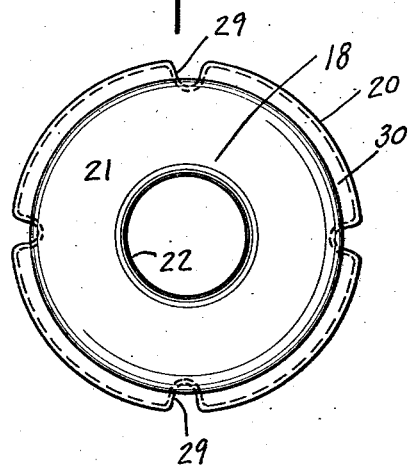
Figure 4:
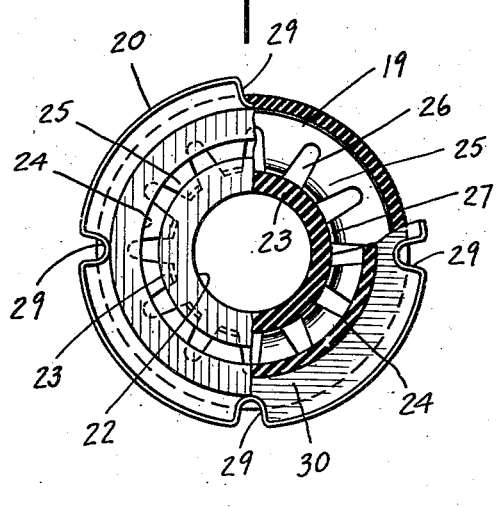

The full nature of the invention will be understood from the accompanying drawing and the following description and claims:

Fig. 1 is a central vertical section through a water pump assembly with parts removed and broken away and with the shaft in elevation with the seal embodying this invention mounted therein under sealing compression. Fig. 2 is an enlarged central vertical section through the unitary seal showing it in its released position. Fig. 3 is a front elevation of the seal looking at the front or right-hand side of Fig. 2. Fig. 4 is a plan view of the seal looking from the opposite side thereof with the carbon washer removed and parts broken away.

In the drawing there is shown for illustrative purposes a portion of a water pump assembly applicable for use in an internal combustion engine and wherein there is provided a driven shaft 10 carrying a pump impeller 11 keyed thereto, which shaft is supported by ball bearings in a bearing sleeve 12 and is driven by the usual belt driven pulley 13. The bearing 12 is supported within and by the pump housing 14 having intake openings 15 and a sealing flange 16. It is the purpose of the seal as assembled in the above-described pump unit to effect a seal between the shaft and assembly housing to prevent leakage of the water therebetween.

For this purpose there is provided a self-sealing flexible fluid sealing device, as best illustrated in Fig. 2. This device includes as its essential elements a carbon washer 17, a flexible sealing member 18, a tension spring 19, and a retaining ring 20.

The flexible sealing member may be made of rubber, Dupreen or a similar resilient and compressible material having like characteristics, and is formed substantially in the shape of a truncated cone having a sloping body portion 21 provided with a central opening 22 through which the shaft to be engaged and gripped thereby extends. Said body portion of the sealing member terminates at the inner periphery with an outwardly extending flange 23, and about its outer periphery with an inwardly extending U-shaped flange 24. The general cone shaped contour of said member is such that upon its face being pressed toward the washer 17 when in sealing position, it will flatten out, and in doing so will contract about its opening 22 and thereby provide a gripping and sealing engagement with the shaft under its own resilient compression.

For the purpose of normally maintaining the sealing member 18 in its extended conical position while permitting it to flatten down to contract its opening about the shaft when in sealing position and under spring tension, the spring member 19 is correspondingly formed with a truncated cone surface and with its outer edge engaging behind the flange 24 for securing it firmly against the inner surface of the body 21 of the member. Said spring is provided with a series of fingers 25 extending radially inwardly at an angle and separated by the cuts or gaps 26, the inner end of the fingers 25 being inwardly turned, as indicated at 27 to provide an interlocking bearing behind the flange 23. The function of said spring is to reinforce and supplement the resilient action of the sealing member in permitting it to be flattened out against spring tension, but exerting a sealing, gripping and wedging action about and against the shaft 10 upon which the seal is mounted. Thus, as shown in Fig. 1, the sealing member and spring are flattened to substantially a radial plane with respect to the shaft and in gripping and sealing engagement about its periphery under tension of said spring.

The carbon washer 17 is provided with a series of lugs 28 formed about its periphery and slightly inset from its bearing surface. Said lugs are shaped to conform with and seat within the ring 20 intermediate the inwardly extending projections formed about the periphery of said ring and indicated at 29. Thus, the carbon washer is adapted to seat within and interlock with the sealing device as a self-contained and unitary part thereof. It is so mounted within the ring 20 as to lie in sealing engagement with the exposed face of the U-shaped flange 24 of the flexible sealing member. Its sealing surface protrudes sufficiently from the ring 20 as to sealingly engage and rotate relative to the sealing surface of the flange 16, under the resilient pressure of the sealing member accentuated by the tension of the spring 19.

As above noted, the sealing member 18 envelops and secures the spring 19 and is interlocked about its periphery with the ring 20, the ring 20 in turn supporting and interlocking with the carbon washer 17. Additionally, as will be observed, the form and action of the sealing member with its reinforcing spring is such as to permit flattening out under spring tension, resulting in the dual effect of reducing the length of the washer, and consequently the shaft, axially thereof, and to effect sealing and wedging action about the shaft.

The invention claimed is:

1. A fluid sealing device adapted to effect a seal between two relative rotative elements including a shaft, said device comprising a disk-like flexible sealing member adapted to embrace said shaft for sealing and gripping engagement therewith, a corresponding disk-like spring embraced within said member formed to exert an inwardly and radially directed wedging action thereupon to supplement said sealing and gripping engagement when under tension, a rigid sealing disk adapted to effect sealing engagement with the other of said elements during relative rotation therebetween, and a confining ring having interlocking engagement with said disk and confining the outer peripheral portion of said member to resist outward expansion and to direct its expanding force inwardly into sealing and gripping engagement with said shaft when said device is axially compressed.

2. A self-contained fluid sealing device comprising a frustro-conical flexible sealing member centrally apertured to receive a shaft to be sealed thereby, a frustro-conical spring plate embedded within said member having flexible portions thereof surrounding the apertured portion of said member and in engagement therewith, a rigid sealing disk coextensive with and operatively abutting the base portion of said member, and a confining ring extending about the peripheral portion of said member and disk in interlocking engagement therewith.

3. A self-contained fluid sealing device comprising a centrally apertured frustro-conical flexible sealing member, the inner portion thereof surrounding the aperture being outwardly flanged to provide an inner annular seat and the outer portion thereof being inwardly flanged to provide an opposing annular seat, a frustro-conical spring plate having a series of inwardly and radially extending spring fingers mounted within said member with said fingers interlocked within said inner seat and the outer periphery of said spring engaging within the said outer seat, a rigid sealing disk coextensive with and lying against the base portion of said member, a confining ring extending about said member and disk having an inwardly extending flange embedded within the corresponding flange of said member, and a series of inwardly protruding projections extending into interlocking recesses formed in the periphery of said disk, whereby said member and disk will be confined as a unit and the flexing forces imparted to said member will be directed inwardly.

4. A fluid sealing device adapted to effect a seal between a shaft and housing having relative rotation therebetween, said device comprising a disk-like flexible sealing member having a normally frustro-conical form apertured centrally thereof for receiving the shaft, a disk spring of corresponding frustro-conical form associated therewith, a rigid sealing disk operatively abutting the base portion of said member on one side thereof and adapted to sealingly engage said housing, and a confining ring extending about the peripheral portion of said member to resist outward expansion thereof, whereby said spring upon being compressed to a flattened form will exert axially directed pressure against said sealing disk for maintaining its sealing relation with said housing and exert a wedging action on said member to supplement its gripping and sealing engagement with said shaft.

5. A self contained fluid sealing device comprising a frustro-conical flexible sealing member centrally apertured to receive a shaft to be sealed thereby, a frustro-conical spring plate operatively associated with said member and having flexible portions thereof surrounding the apertured portion of said member and in engagement therewith, a rigid sealing disk coextensive with and operatively abutting the base portion of said member, and a confining ring extending about the peripheral portion of said member and disk, said ring having portions thereof interlocking with said member and disk to provide a driving connection therebetween.

6. A self-contained fluid sealing device adapted to effect a seal about a shaft, said device comprising a centrally apertured normally frusto-conical flexible sealing member, the inner portion thereof surrounding the aperture being outwardly flanged to provide an annular seat, and the outer portion thereof being inwardly flanged to provide an opposed annular seat, and a frusto-conical spring disc having a series of inwardly and radially extending spring fingers mounted within said member with said fingers interlocked within said inner seat and the outer periphery of said spring disc engaged within the said outer seat, whereby upon said sealing device being forced to collapse to a substantially flattened form under sealing pressure the fingers of said spring disc will wedge the apertured portion of said member radially inwardly about said shaft.

TITUS E. FRANKENFIELD.